United States Patent Office

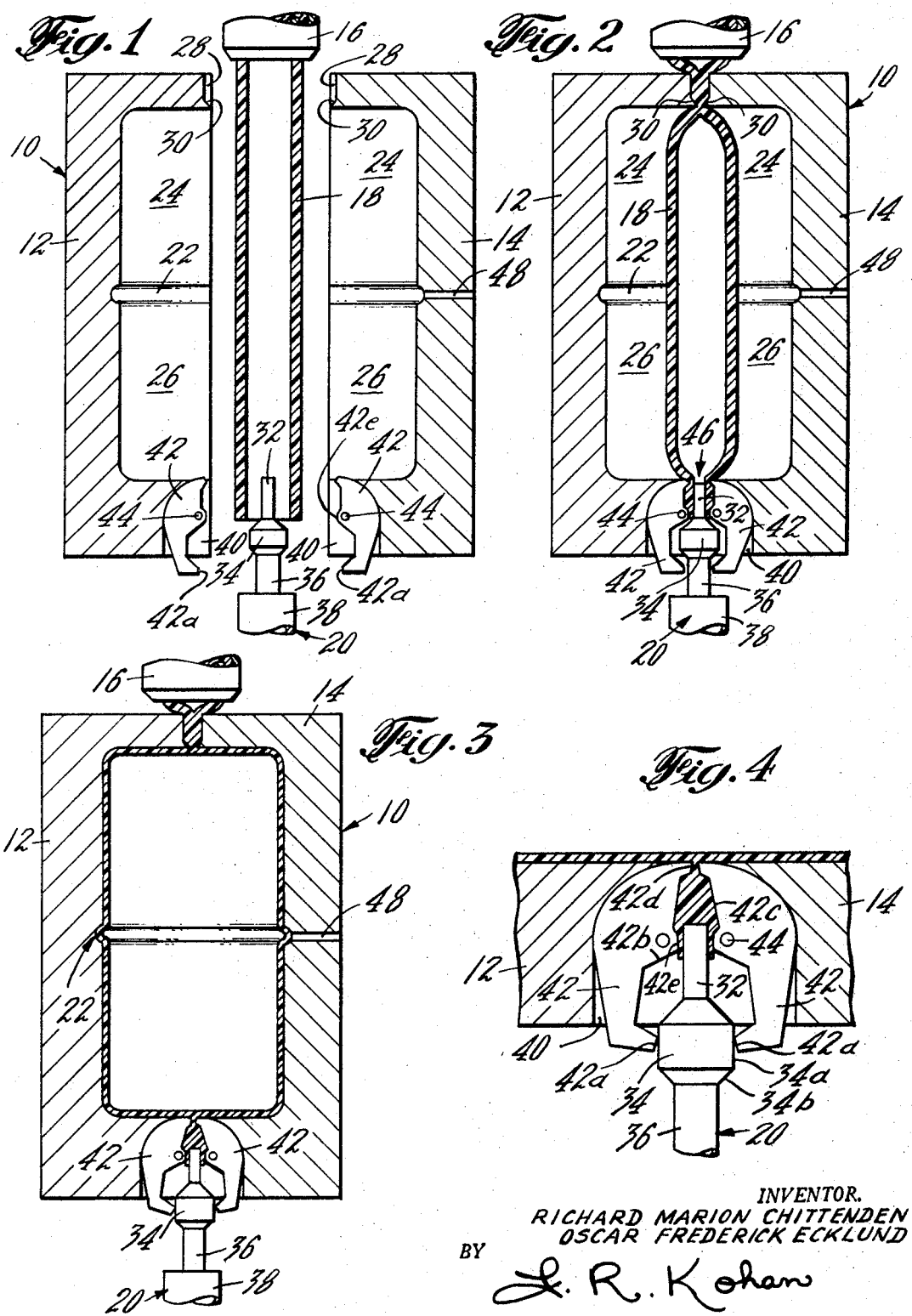

3,428,722
Patented Feb. 18, 1969

3,428,722
METHOD AND APPARATUS FOR BLOW MOLDING HOLLOW THERMOPLASTIC ARTICLES
Richard Marion Chittenden, Grayslake, and Oscar Frederick Ecklund, Barrington, Ill., assignors to American Can Company, New York, N.Y., a corporation of New Jersey
Filed Sept. 16, 1966, Ser. No. 580,064
U.S. Cl. 264—98   7 Claims
Int. Cl. B29d 3/00

The present invention relates to an improvement in the method and apparatus for blow molding heat-softened thermoplastic hollow articles, such as containers, and is adaptable to blow mold either single articles where blowing in the conventional manner is not convenient or possible, or to blow mold a plurality of interconnected hollow articles which are simultaneously blown.

In general, blow molding consists of a process of series of manufacturing steps wherein plastic is heated and softened to a thermoplastic condition, and is extruded from a die as an elongated tubular sleeve, known in the art as a parison, into an opening between a pair of spaced mold halves. When the mold halves close, one end of the parison is completely closed, generally between the pinch edges in the mold faces, while the other end of the parison is prepared for introduction of gaseous fluid to be supplied to the interior of the parison. The preparation of this other end takes the form of closing the end over a blow pin or nozzle while leaving an opening for the introduction of air. The streaming of air or other suitable fluid into the heat-softened parison serves to deform the parison outwardly and into contact with the inner walls of the mold halves. Thus, the parison is converted from an elongated tubular sleeve into a hollow article, shaped to conform to the internal configuration of the mold halves. After the article has been formed and suitably cooled, the gaseous fluid is released from the interior of the article, the latter is removed from the mold halves, and the foregoing cycle may be repeated. Usually, in blow molding, the blowing and exhausting are done through the neck of the container. However, in certain applications, as in two-up blowing, it is necessary to close and seal the opening through which the article has been blown. One problem encountered in this procedure has been closing the opening through which the fluid enters the parison.

Accordingly, it is an object of the present invention to overcome the difficulties associated with prior art blow molding techniques, and to provide in their stead, an improved method and apparatus.

Another object of the present invention is to provide a method and apparatus, of the character described, wherein the parison, after having been expanded, is pinched closed with minimum distortion of the internal wall thereof.

Still another object of the present invention is to provide a blow molding method and apparatus whereby a defect-free surface is obtained at the location where the expanded parison, after having been pinched closed, is severed from the portion of the parison through which the blowing agent was introduced to provide the expanding action.

A further object of the present invention is to provide an apparatus and method, as set forth, whereby the thickness of the wall of the expanded parison is uniform throughout.

A yet further object of the present invention is to provide a method and apparatus, of the character described, which is readily adaptable to operate in conjunction with the conventional mold halves used for blow molding purposes.

A still further object of the present invention is to provide a blow molding apparatus, as set forth, which may be repetitively operated in a reliable manner, and which requires low maintenance.

Numerous other objects and advantages of the present invention will become apparent from the following detailed description, which, taken in conjunction with the annexed drawings, discloses a preferred embodiment thereof.

The foregoing objects are achieved by providing a method and means wherein an extrusion nozzle is located above a pair of split mold halves and a blow pin is aligned beneath the extrusion nozzle at the lower end of the mold halves. In operation, a thermoplastic parison is extruded from the nozzle to extend downwardly between the open mold halves and to surround the blow pin. When the mold halves are then closed, the parison is pinched closed on one end of the mold and the other end of the parison is pinched into contact with the exterior of the blow pin so that the latter projects directly along the parting line of the mold halves. Air is then introduced through the blow pin for a short interval to expand the parison into conformity with the interior configuration of the closed mold halves. The partially opened end of the parison is then closed off by a clamping arrangement associated with the mold halves. This closure is followed by a thinning of the expanded parison within the mold at its juncture with the portion in contact with the exterior of the blow pin. The thinning operation as well as the closure step thereinbefore, are performed so that the wall of the expanded parison, at the area of thinning and closure, is not distorted, and the wall is left substantially without defects. After the plastic has cooled, the air is exhausted from within the blown articles or article by puncturing or cutting the inflated parison between its ends. The mold halves are then opened to eject the blow-molded articles.

Referring to the drawings:

FIGURE 1 is a sectional side elevational view of a tubular parison being extruded between a pair of opened mold halves shaped to form a pair of interconnected containers;

FIGURE 2 is a sectional side elevational view, similar to FIGURE 1, but with the mold halves closed;

FIGURE 3 is a sectional side elevational view, similar to FIGURE 2, but with the parison being blown into conformity with the interior configuration of the mold halves; and, FIGURE 4 is a fragmentary side elevational view of the clamping arrangement which pinches closed and thins the remaining portion of the parison.

As a preferred or exemplary embodiment of the apparatus involved in the present invention, FIGURE 1 illustrates a portion of blow molding apparatus generally designated 10. The apparatus 10 includes a pair of mold halves 12 and 14 which are movable relative to each other. The mold halves may be moved apart or brought together to form a closed mold by mating along a vertical parting line. The mold halves 12 and 14 may be moved synchronously and in opposite directions by being connected to conventional air cylinders or other suitable actuating devices not shown in the drawing.

A conventional extrusion die 16 is disposed above the mold halves and in general symmetrical alignment with respect to the vertical parting line. The die functions to extrude a heated and softened tubular organic plastic parison 18, formed of polyethylene or some other suitable thermoplastic material. When extruded, the parison 18 flows or moves downwardly between the open mold halves 12 and 14.

A hollow blow tube or blow pin 20 is situated at the lower end of the mold, and aligned beneath the extrusion die 16. The blow pin is adapted to be connected to a suitable source of air or other blowing fluid. From the configuration of FIGURE 1, it is apparent that the parison 18 surrounds the blow pin 20, but is free from contact with the exterior surface thereof.

The interior configuration of the mold halves 12 and 14 may be designed to produce a plurality of interconnected articles which may be separated after the completion of the molding operation. In the exemplary form shown in the drawing, the mold sections are designed to produce two wide-mouthed containers interconnected at their mouths. For the purpose of producing this design, an annular groove 22, separating the upper cavity 24 from the lower cavity 26, is located medially with respect to the mold. The top edge of each of the mold halves 12 and 14 is provided with a pinch pocket 28 and a pinch-off projection 30.

In carrying out the molding process, the extrusion die 16 extrudes the parison 18 which extends downwardly and surrounds the blow pin 20. The mold halves 12 and 14 are then closed so that the apparatus 10 assumes the position shown in FIGURE 2. The projections 30 pinch the upper end of the severed parison to the extent that a closure is formed. The extruded parison is separated from the plastic within the extruder in a suitable manner (not shown) depending upon the particular extrusion method and apparatus used, so that the parison being extruded at any given time will have an open lower end capable of being telescoped over the blow pin 20. This separation may be secured by ripping the blown parison, with the flash attached, off the exterior orifice. The separation may also be accomplished by a positive severing operation involving a knife or shear.

The blow pin 20 is constructed of an upper outlet or nozzle section 32, a cam 34, a transition section 36, and a cylindrical mounting section 38. The blow pin 20 is reciprocated vertically by means not shown. Air or other suitable blowing fluid is conveyed through nozzle section 32, cam 34, transition section 36, cylindrical section 38, as well as suitable ducts and tubing (not shown) from an appropriate generator for blowing fluid, as for example, an air compressor.

Each lower end of the mold halves 12 and 14, includes a cavity 40 wherein the cam 34 may move freely when the mold halves are in the closed position. The cam 34 operates in conjunction with two cam followers 42. These cam followers are rotatably mounted on the pivots 44 which are secured to the walls of the cavities 40. In its operation, the cam 34 moves vertically upward and downward within a limited range. The cam followers 42 are provided with follower edges 42a which contact the surfaces of the cam 34.

When the mold is closed as shown in FIGURE 2, the blow pin 20 is located at its uppermost position wherein the cam 34 is enveloped by the cam followers 42. In order to thus accommodate the cam 34, the cam followers have a recess 42b. The cam followers also have recesses 42c which provide a cavity for the lower portion of the parison adjacent to the outlet section 32. The closing of the mold is accomplished so that an opening 46 remains at the lower portion of the parison, and, at the same time, the sealing edges 42e of the cam followers press tightly against the walls of section 32. This opening connects the interior of the parison with the interior of the fluid outlet 32 and is in concentric alignment therewith. The blow fluid streaming from the mouth of section 32, therefore, exerts pressure uniformly on the interior walls of the parison and forces the latter against the upper and lower cavities 24 and 26 of the mold. As a result, the wall thickness of the articles produced by this method, is uniform throughout.

Accordingly, in the operational step shown in FIGURE 1, the parison telescopes freely over the outlet 32 of the blow pin, and the cam 34 is disposed so that it is aligned with the recesses 42b. When the mold is closed, as shown in FIGURE 2, the cam 34 resides freely within the recesses 42b, and the sealing edges 42e are forced tightly aaginst the exterior of the section 32 of the blow pin. The interior of the parison is thus sealed off from the atmosphere, and the blowing fluid cannot escape.

When air or other suitable blowing fluid is introduced into the interior of the parison through blow pin 20, the parison is deformed outwardly and forced aaginst the interior walls of the mold. Due to the heated and hence softened condition of the plastic, the parison assumes the configuration of the mold, as shown in FIGURE 3. After a sufficient amount of blowing fluid has been introduced under pressure to assure that the parison has become shaped into the desired articles, the mouth above the blow pin is closed off. This is accomplished by moving the blow pin together with the cam 34, in a downward direction. Such movement of the cam, causes the follower edges 42a to bear against the cam surface 34a, and as a result, the follower edges shown in FIGURE 3 are spaced further apart than in FIGURE 2. The spacing of the follower edges, in this manner, produces rotations of the cam followers about the pivots 44, so that the recesses 42c are brought closer together. The cam followers 42 are provided with pinching or pinch-off edges 42d which are in contact with the lower portion of the parison. When the cam followers are rotated in the manner described, these pinch-off edges are brought together and initially close off the opening 46 into the parison by forcing the walls of the opening together. The closing-off process is performed during the interval when the follower edges 42a are in contact with the surface 34b of the cam 34. The surface 34b is inclined to form a smooth path for the follower edges 42a, and at the same time, diminish the amount of force that must be exerted to move the blow pin downward. Thus, the cam surface 34b operates on the basis of the commonly-known principle of the inclined plane. Once the blow pin has moved downward to the extent that the follower edges 42a are in contact with the cam surface 34a, the pinch-off edges 42d are brought into line-contact with each other. This action thins and almost severs the portion of plastic trapped between the outlet of the blow pin and the edges 42d, from the plastic within the mold.

The pinch-off edges 42d are sloped or inclined so that they intersect to form a sharp forming edge in contact with the lower surface of the mold. This forming edge is a result of the line-contact of the edges 42d, and assures that, after the opening 46 has been sealed, the plastic extending below the cavity 26 is squeezed very thin so that the flash may be neatly trimmed in a subsequent operation. Through the cooperative action of the cam 34 and followers 42, this pinching operation is performed in a manner which leaves the surface of the formed plastic product substantially smooth and without defects. The pinching operation, furthermore, does not alter the contour or profile of the formed product.

Before the mold halves 12 and 14 are opened to eject the blown articles therefrom, the air pressure within the molded articles is released. This may be accomplished in any one of a number of possible ways, one of which consists of providing a small opening or duct 48 communicating with the annular groove 22. A needle or other sharp instrument, not shown, may then be inserted through the duct 48 to pierce the plastic, after the latter has cooled sufficiently, and such needle can afterwards be withdrawn to allow the air to escape through the opening 48.

The method aspects of the present invention, which have been broadly described hereinbefore in conjunction with the preferred form of the apparatus, are closely related to the apparatus and stem from a single inventive concept. Thus, the plastic material from which the parison is to be formed, is supplied in pellets or some other suitable form to a conventional extrusion apparatus. The latter is, in turn, juxtaposed to an extrusion die such as the die 16 in the above-described apparatus. In the extrusion apparatus, the plastic is heated to a fluent condition and is then fed to the extrusion die which forms the plastic into a tubular parison formed of heated and softened plastic. The diameter of the parison is predetermined by appropriate selection of a die having the proper size opening therein.

The die is disposed in a substantially vertical position, and thus the extruded parison feeds vertically downward as it is being extruded. The rate of extrusion of the parison is a function of many variables such as temperature, viscosity of the plastic material, size of the die opening, and other similar parameters. These other parameters are, however, not critical to the invention, and the rate of extrusion of the parison is readily controlled by those skilled in the art.

The blow pin 20 is vertically disposed and directly aligned with the extrusion die 16. The distance by which the blow pin 20 is spaced from the die 16, is determined by the size of the mold halves which, in turn, is determined by the size and number of articles to be blown in a single operation. As the extruded parison 18 moves downward, it telescopes over the blow pin 20, and to assure that such telescoping action takes place freely, the exterior dimension of the section 32 is smaller than the interior dimensions of the parison.

When the parison has travelled downward so that its lower end overlaps properly the blow pin and is below the line connecting the pivots 44, the mold halves 12 and 14 are synchronously and oppositely actuated to move into registration with one another. Such mold half registration serves the function of selectively closing off the opposite ends of the parison. Thus, at the upper end of the parison, the cooperating projections 30 on the mold halves pinch the parison closed. At the lower end of the parison, the sealing surfaces 42e of the cam followers 42 squeeze the parison into contiguous contacting relationship with the exterior of the blow pin. To assure such contact, the surfaces 42e of the cam followers and the blow pin are selectively sized so that, when the mold halves are closed, the radial distance between the exterior of the blow pin and the sealing surfaces 42e, is preferably less than the thickness of the parison walls.

The extrusion operation terminates when the mold halves close. Once the blowing operation has been completed and the mold halves are opened to eject the blown articles, the extrusion operation commences again. As already indicated, the extruded parison may be separated from the next parison by either a positive severing operation or a mere ripping to free the blown article at the mouth of the extrusion orifice. It may, therefore, be seen that the overall series of operational steps is a sequential, though intermittent, one. Thus, when the mold is closed, the extrusion operation is temporarily halted. The extrusion may also be carried out on a continuous basis with intermittent delivery of the parison.

With regard to the method of forming articles from the parison now disposed within the closed mold, a critical feature of the present inventive method resides in the condition that the open end of the blow pin be in direct communication with the interior of the parison. It is, therefore, important that the closure of the mold halves be not accompanied by pinching of the lower end of the parison so that the latter becomes closed above the blow pin.

With the mold properly closed, and the parison having its upper end pinched closed and its lower end pressed tightly against the blow pin, in the vicinity of pivots 44, the blowing step can be performed. In the blowing step, air or other suitable blowing agent is introduced through the blow pin and into the interior of the parison. It is considered important to introduce a sufficient quantity of air in a relatively short time interval in order to assure that the parison will be rapidly expanded. Such rapid expansion is essential to prevent substantial cooling of the parison before it has assumed the shape of the mold. The required volume of blowing agent and the rate at which the latter is introduced into the mold, is, accordingly, determined by the size of the parison and the amount of expansion needed.

For any given size of parison placed within any given size of mold, the important criterion is that enough blowing agent be introduced to fully expand the parison into contact with the mold walls, within a relatively short time interval. The reason for this requirement of rapid expansion, is to ascertain that the exterior of the blown articles has good "definition." Expressed in other terms, rapid expansion is necessary to assure that the exterior of the blown parison conforms contiguously and precisely to the interior configuration of the mold. While the need for rapid expansion is important, in any case, to assure that the parison does not cool significantly before contacting the mold walls, it is especially important if the mold walls have intricate contours or have recessed intaglio designs or lettering.

When the blowing step has been completed, the parison opening above the blow pin is closed off. Such a closing step assures that the entire parison is completely closed, and that the blowing agent is trapped therewithin. In the apparatus described above, this closing step is accomplished by the cam followers 42 which, when actuated, squeeze the walls of opening 46 together through means of the edges 42d.

After the closing step is completed, and sufficient time has been allowed for the plastic to cool, an exhausting step is performed at some location other than that of the blowing opening. In the above-described apparatus, for example, exhausting takes place at the medial annular groove 22 where the two blown articles are interconnected. However, even if some other form of apparatus or some other configuration of mold is used, such exhausting may be accomplished by piercing the blown articles at some selected point along the side wall of the expanded parison. Generally, a sharp implement is used to pierce an opening in the expanded parison, and the pressurized blowing agent trapped within the blown parison can then escape through this pierced opening. When this exhausting step has finally been accomplished, the mold halves open to eject the blown articles and the foregoing sequence of steps is then repeated.

As a summary of the method steps involved in the process aspects of the present invention, it can be seen that there is involved (a) the step of extruding a heated and softened tubular thermoplastic parison, (b) continuing such extrusion until the parison telescopes over an open-ended blowing pin, (c) terminating such extrusion and substantially simultaneously closing a pair of mold halves, (d) bringing the mold halves into registry to press one end of the parison into contact with the exterior of the blow pin and to pinch closed the opposite end of the parison, (e) separating the extruded parison from the resin within the extruder before or after the blowing operation, (f) introducing a blowing agent through the blow pin into the interior of the parison to rapidly expand the parison into firm contact with the mold walls, (g) closing off the end of the parison immediately above the open end of the blow pin, (h) permitting the expanded parison to cool to a predetermined state of solidification, (i) piercing the expanded parison at a selected location between its closed ends, (j) permitting the blowing agent trapped within the expanded parison to escape through the pierced opening, (k) opening the mold members to eject the blown articles formed by the expanded parison, and (l) repeating the foregoing steps in their sequential order to repeat the process.

It is thought that the invention and many of its attendant advantages will be understood from the foregoing description and it will be apparent that various changes may be made in the form, construction and arrangement of parts and that changes may be made in the steps of the method described and in their order of accomplishment without departing from the spirit and scope of the invention or sacrificing all of its material advantages, the form hereinbefore described being merely a preferred embodiment thereof.

The embodiments of the invention in which an exclusive property or privilege is claimed are defined as follows:

1. A process for blow molding hollow tubular plastic articles, comprising the steps of:
  extruding a tubular thermoplastic parison and locating it between a pair of opened mold halves and in surrounding relationship to a blow pin;
  closing said mold halves to press one end of the parison into tight conforming relationship to the exterior of the blow pin and to pinch closed the other end of said parison;
  introducing blowing agent through said blow pin to expand said parison outwardly and into contact with the interior walls of said mold halves;
  closing the end of said parison adjacent said blow pin to seal off communication between said blow pin and the interior of said parison;
  pinching said expanded parison along a line coinciding with the surface of the mold, said pinching step producing a relatively thin web separating said expanded parison from the portion of said parison in contact with said blow pin;
  piercing said expanded parison at a selected location between its closed ends to release said blowing agent from within said expanded parison; and
  opening said mold halves to eject the blown articles now formed by said expanded parison.

2. A process as defined in claim 1 wherein said step of closing includes operating a clamping arrangement to engage said parison immediately beyond the end of said blow pin and to pinch said parison closed.

3. A method for forming a plurality of interconnected hollow articles of thermoplastic material, said method comprising the steps of:
  opening a pair of laterally movable mold halves;
  disposing an extrusion die between said opened mold halves;
  disposing a blow pin in axial alignment with said extrusion nozzle;
  extruding a heated and softened tubular thermoplastic parison from said extrusion nozzle;
  continuing such extrusion until said parison reaches a predetermined length whereat one end of said parison is surrounding said blow pin;
  terminating such extrusion and substantially simultaneously closing said mold halves;
  bringing said mold halves into registry to press that end of the parison surrounding said blow pin into firm contact with the exterior thereof and to pinch closed the opposite end of said parison;
  separating the extruded parison from the next subsequent parison to be extruded;
  introducing a blowing agent through said blow pin and an opening leading into the interior of said parison to rapidly expand said parison into firm contact with the walls of said mold halves;
  closing off the end of said parison immediately beyond said blow pin to thus terminate communication between said blow pin and the interior of said expanded parison, said closing step being performed so that the sealed interior wall of said parison remains relatively undistorted thereby;
  pinching thin said expanded parison along a line coinciding with the surface of the mold, said pinching step producing a relatively thin web separating said expanded parison from the portion of said parison in contact with said blow pin;
  permitting said expanded parison to cool to a predetermined state of solidification within said closed mold halves;
  piercing said expanded parison at a selected location between its closed ends;
  permitting the blowing agent trapped within said expanded parison to escape through the opening formed by said piercing steps;
  opening said mold halves to eject the blown articles formed by said expanded parison; and
  repeating the foregoing steps.

4. A method as defined in claim 3 wherein both said closing step and said step of pinching thin that portion of the parison telescoped over said blow pin are accomplished by operating a clamping arrangement to squeeze together the walls of said opening leading into the interior of said parison and to separate the squeezed portion from the expanded parison by a thinly squeezed web.

5. A blow molding apparatus comprising:
  a pair of synchronously movable and oppositely acting mold halves;
  an extrusion die spaced beyond the terminal end of said mold halves;
  a movable blow pin axially aligned with said extrusion nozzle and disposed at least partially between said mold halves;
  said extrusion nozzle being adapted to extrude a thermoplastic parison between said mold halves and in surrounding relationship to said blow pin;
  said blow pin being adapted to introduce a gaseous blowing agent to deform said parison outwardly and into conformity with the walls of said mold halves;
  clamping means supported by said mold halves and having means for pressing said parison tightly into engagement with the exterior of said blow pin when said mold halves are actuated to a closed position;
  sealing means associated with said clamping means for sealing said parison after deformation;
  pinching means associated with said clamping means for pinchingly separating, along a thin web, said deformed parison from that portion of the parison extending from the sealed surface toward said blow pin; and
  actuating means secured to said blow pin and actuating said clamping means upon movement of said blow pin.

6. A blow molding apparatus as defined in claim 5 wherein the internal configuration of said mold halves includes a plurality of cavities to thus form a plurality of interconnected blow molded articles.

7. In a blow molding apparatus having a pair of mold halves with a blow pin disposed between said halves and along the parting line thereof whereby an extruded parison can telescopically surround said blow pin, an improved construction for said mold halves comprising:
  each of said mold halves having a shaped recess therein for retaining a cam follower having a molding surface so that when said mold halves are moved to a closed and registered position, said molding surfaces circumferentially surround said blow pin and serve to press said parison into contact with the exterior surface of said blow pin;

said cam followers being pivotably mounted within said recesses;

a cam secured to said blow pin and movable therewith, said cam being moved by said blow pin for actuating said cam followers;

said cam followers having means cooperating to close the end of said parison adjacent said blow pin for sealing off communication between said blow pin and the interior of said parison when said followers are actuated by said cam;

said cam followers having pinching means cooperating to pinchingly separate, by a thin web, the blown parison within said mold halves from the portion telescopically surrounding said blow pin when said followers are actuated by said cam;

said cam followers having means in contact with said cam whereby said followers are actuatable by said cam.

References Cited

UNITED STATES PATENTS

| | | | |
|---|---|---|---|
| 3,296,345 | 1/1967 | Dietz | 264—275 |
| 1,740,144 | 12/1929 | Barrett | 65—261 |
| 2,890,483 | 6/1959 | Soubier | 264—98 |

ROBERT F. WHITE, *Primary Examiner.*

R. SHEAR, *Assistant Examiner.*

U.S. Cl. X.R.

264—98; 18—5